(12) United States Patent
Rose

(10) Patent No.: US 8,648,256 B1
(45) Date of Patent: Feb. 11, 2014

(54) INTUMESCENT SWELL DEVICES

(75) Inventor: Elmer Algin Rose, Grand Saline, TX (US)

(73) Assignee: Intumescent Technologies, LLC, Atlanta, GA (US)

(\*) Notice: Subject to any disclaimer, the term of this patent is extended or adjusted under 35 U.S.C. 154(b) by 505 days.

(21) Appl. No.: 12/975,848

(22) Filed: Dec. 22, 2010

Related U.S. Application Data

(60) Provisional application No. 61/397,121, filed on Jun. 7, 2010.

(51) Int. Cl.
| | |
|---|---|
| H01H 9/04 | (2006.01) |
| H01H 13/06 | (2006.01) |
| H01H 19/06 | (2006.01) |
| H02G 3/08 | (2006.01) |
| H01R 13/527 | (2006.01) |

(52) U.S. Cl.
USPC ............... 174/54; 174/53; 174/535; 174/481; 174/565

(58) Field of Classification Search
USPC .................................. 174/535, 481
See application file for complete search history.

(56) References Cited

U.S. PATENT DOCUMENTS

| | | | | |
|---|---|---|---|---|
| 4,134,636 A | * | 1/1979 | Kleinatland et al. .......... | 439/535 |
| 4,163,137 A | * | 7/1979 | Close, Jr. .................... | 200/302.3 |
| 4,477,694 A | * | 10/1984 | Kohaut ......................... | 174/484 |
| 4,549,241 A | * | 10/1985 | Morris et al. ................. | 361/45 |
| 4,588,523 A | * | 5/1986 | Tashlick et al. ............... | 252/606 |
| 4,616,104 A | | 10/1986 | Lindsey | |
| 4,667,840 A | * | 5/1987 | Lindsey ........................ | 220/3.2 |
| 4,725,457 A | * | 2/1988 | Ward et al. .................. | 427/385.5 |
| 4,733,330 A | * | 3/1988 | Tanaka et al. ................ | 361/641 |
| 4,865,556 A | * | 9/1989 | Campbell et al. ............. | 439/97 |
| 4,930,960 A | * | 6/1990 | Jadatz ........................... | 411/188 |
| 5,044,983 A | * | 9/1991 | Mahaney et al. ............. | 439/539 |
| 5,132,054 A | * | 7/1992 | Stahl ............................ | 252/606 |
| 5,389,011 A | * | 2/1995 | Eder ............................ | 439/577 |

(Continued)

FOREIGN PATENT DOCUMENTS

| | | | |
|---|---|---|---|
| DE | 10132058 A1 | * | 1/2003 |
| EP | 2472685 A1 | * | 7/2012 |
| GB | 2446271 A | * | 8/2008 |
| GB | 2460270 A | * | 11/2009 |

OTHER PUBLICATIONS

"Box Extenders" Arlington Industries Inc. Catalogue, downloaded Dec. 22, 2010 from http://www.arlcatalog.com/Miscellaneous/Box%20Extenders.htm, 1 page.

*Primary Examiner* — Jeremy C. Norris
*Assistant Examiner* — Nathan Milakovich
(74) *Attorney, Agent, or Firm* — Hill, Kertscher & Wharton, LLP

(57) ABSTRACT

The following detailed description is directed to intumescent swell devices. According to various embodiments, the swell devices disclosed herein can be used alone or in combination with one another to provide heat and/or fire protection for electrical systems, devices, and/or assemblies. According to exemplary embodiments, intumescent electrical devices, intumescent firewall insert boxes, intumescent flanges, and/or intumescent electrical boxes are disclosed herein for use individually and/or in combination with one another. Additionally, the disclosed intumescent electrical components disclosed herein can be used in combination with intumescent electrical device cover plates, intumescent screws, and intumescent gaskets, if desired. Methods for building electrical assemblies and for retrofitting electrical assemblies to provide fire protection also are provided.

3 Claims, 8 Drawing Sheets

(56) References Cited

U.S. PATENT DOCUMENTS

| | | | |
|---|---|---|---|
| 6,051,785 A * | 4/2000 | Baldwin et al. | 174/54 |
| 6,252,167 B1 | 6/2001 | Rose | |
| 6,369,322 B1 | 4/2002 | Gretz | |
| 6,521,834 B1 | 2/2003 | Dykhoff et al. | |
| 6,706,793 B2 * | 3/2004 | Abu-Isa et al. | 524/409 |
| 6,732,481 B2 * | 5/2004 | Stahl, Sr. | 52/406.1 |
| 6,750,395 B2 * | 6/2004 | Stout et al. | 174/483 |
| 6,790,893 B2 | 9/2004 | Nguyen et al. | |
| 6,989,488 B2 * | 1/2006 | Valenziano | 174/483 |
| 7,052,314 B1 | 5/2006 | Rose | |
| 7,189,928 B2 * | 3/2007 | Denier | 174/481 |
| 7,193,152 B2 * | 3/2007 | Moselle | 174/50 |
| 7,208,677 B2 * | 4/2007 | Moselle | 174/50 |
| 7,320,536 B2 * | 1/2008 | Petrakis et al. | 362/364 |
| 7,348,484 B1 | 3/2008 | Ackerman et al. | |
| 7,521,495 B2 * | 4/2009 | Horacek et al. | 524/100 |
| 7,569,776 B2 * | 8/2009 | Jolly et al. | 174/483 |
| 7,674,977 B1 * | 3/2010 | Constantino | 174/67 |
| 7,812,253 B2 * | 10/2010 | Moselle | 174/50 |
| 7,847,199 B2 * | 12/2010 | Drane et al. | 174/483 |
| 2002/0056713 A1 * | 5/2002 | Rose | 220/62.11 |
| 2005/0070647 A1 * | 3/2005 | Iyoshi et al. | 524/155 |
| 2006/0102369 A1 * | 5/2006 | Milani et al. | 174/48 |
| 2008/0053697 A1 * | 3/2008 | Bowman | 174/483 |
| 2009/0272572 A1 * | 11/2009 | Collins et al. | 174/503 |
| 2010/0086268 A1 * | 4/2010 | Reyes | 385/100 |
| 2012/0125657 A1 * | 5/2012 | Brown et al. | 174/110 SR |

* cited by examiner

INTUMESCENT SWELL DEVICES

CROSS REFERENCE TO RELATED APPLICATIONS

This application claims the benefit of U.S. Provisional Patent Application No. 61/397,121, entitled "Firewall Insert Box," filed Jun. 7, 2010, which is hereby incorporated by reference in its entirety. This application also is related to U.S. Provisional Patent Application No. 60/925,160, entitled "Swell Devices," filed Apr. 10, 2007, now expired, which is hereby incorporated by reference in its entirety.

TECHNICAL FIELD

The present disclosure is directed to electrical assemblies. More particularly, the present disclosure is directed to intumescent swell devices for use with, and in, electrical assemblies.

BACKGROUND

Fire protection is an important aspect of building design. Modern residential and commercial buildings may require extensive amounts of electrical wiring and devices. Over time, or if installed improperly, degraded or faulty wiring can cause fires or other high heat conditions due to arcing and/or other causes. Due to the threat of fire and/or other heat conditions as a result of degraded and/or faulty wiring and devices, modern building codes often impose fire ratings and design guidelines to minimize the threat of fire due to degraded or faulty wiring and/or electrical devices and assemblies.

Compliance with building codes can create added costs and/or can affect aesthetic and ergonomic aspects of a building. For example, building codes often restrict the placement of electrical boxes in rooms or in adjacent walls. One such requirement is that electrical boxes may not be placed within twenty four inches of one another in a back-to-back configuration on opposite sides of a fire rated wall ("firewall") or other structure. This requirement may make electrical box placement on opposite sides of a fire-rated wall difficult.

Additionally, degradation and/or failure of faulty electrical devices can cause fires. While various fire protection devices and/or materials are available for addressing some types of failures occurring within an electrical box or behind an electrical device cover, other failures may be difficult to protect against. For example, degradation or failure of various electrical devices may create a fire hazard. The design of the electrical device, however, may make protecting against the hazard difficult, if not impossible.

It is with respect to these and other considerations that the disclosure made herein is presented.

SUMMARY

The present disclosure is directed to intumescent swell devices. According to the concepts and technologies disclosed herein, intumescent electrical devices, intumescent electrical boxes, intumescent firewall insert boxes, and intumescent flanges are provided. These and other intumescent electrical devices and/or assemblies can be used individually and/or in combination with one another and other devices or assemblies to provide fire protection for various structures and assemblies. According to some implementations, embodiments of the concepts and technologies described herein can be used to allow installation of back-to-back electrical box installations in a fire rated wall without degrading the fire rating of the wall. These and other embodiments of intumescent swell devices are described in greater detail herein.

According to an aspect, an intumescent electrical device is provided. In one contemplated embodiment, the intumescent electrical device provides functionality associated with an electrical receptacle. The plug assemblies of the electrical receptacle can be made from an intumescent material such as an intumescent plastic. The intumescent material can be configured to swell in the event of a fire or high heat condition to smother the fire or insulate other devices or structures to prevent spreading of the fire from within the electrical receptacle to other devices or structures.

According to another aspect, an intumescent electrical box is provided. The intumescent electrical box can be formed from one or more intumescent materials. In some embodiments, the intumescent electrical box is formed from an intumescent plastic or other intumescent material. In other embodiments, the intumescent electrical box is formed from a non-intumescent material such as aluminum, stainless steel, fiberglass, or the like, and is coated with an intumescent material such as an intumescent plastic, an intumescent paint, and/or an intumescent coating. The intumescent material or coating can be configured to smother the fire or insulate other devices or structures to prevent spreading of the fire from within the intumescent electrical box to other devices or structures.

According to another aspect, an intumescent firewall insert box is provided. The intumescent firewall insert box can be formed from one or more intumescent materials. In some embodiments, the intumescent firewall insert box is formed from an intumescent plastic or another material. In other embodiments, the intumescent firewall insert box is formed from a non-intumescent material such as aluminum, stainless steel, fiberglass, or the like, and is coated with an intumescent material such as an intumescent plastic, an intumescent paint, and/or an intumescent coating.

The intumescent firewall insert box is configured for insertion into an electrical box such as the intumescent electrical box to provide additional fire protection for the wiring and/or other electrical devices disposed in the electrical box. The intumescent firewall insert box includes one or more walls connected to a flange portion. The walls are configured for insertion into an electrical box, and the flange portion is configured to cover a gap between the electrical box and a wall covering adjacent the electrical box. The flange portion can provide fire protection at the gap to prevent spreading of heat or fire during a fire or high heat condition proximate to the gap. In some embodiments, the intumescent firewall insert box is configured for insertion into non-intumescent electrical boxes to provide fire protection for the electrical boxes, if desired.

According to yet another aspect, an intumescent flange is provided. The intumescent flange can be formed from one or more intumescent materials. In some embodiments, the intumescent flange is formed from an intumescent plastic or another material. In other embodiments, the intumescent flange is formed from a non-intumescent material such as aluminum, stainless steel, fiberglass, or the like, and is coated with an intumescent material such as an intumescent plastic, an intumescent paint, and/or an intumescent coating.

The intumescent flange is configured to cover a gap between an electrical box and a wall covering proximate to the electrical box. The intumescent flange can be used to increase protection provided by the flange portion of the intumescent firewall insert box, if desired. Additionally, or alternatively, the intumescent flange can be used to extend, increase, or compliment the fire protection provided by the flange portion of the intumescent firewall insert box.

The various electrical devices disclosed herein can be used individually or in combination with one another and/or other devices and assemblies to provide fire protection for a particular electrical device, assembly, or wiring. According to one embodiment, the intumescent electrical device, the intumescent firewall insert box, the intumescent flange, and the intumescent electrical devices are used in combination to provide fire protection. Additional or alternative fire protection devices such as intumescent electrical device covers and/or intumescent gaskets can be used to further increase the fire protection of a particular electrical system, assembly, or device.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
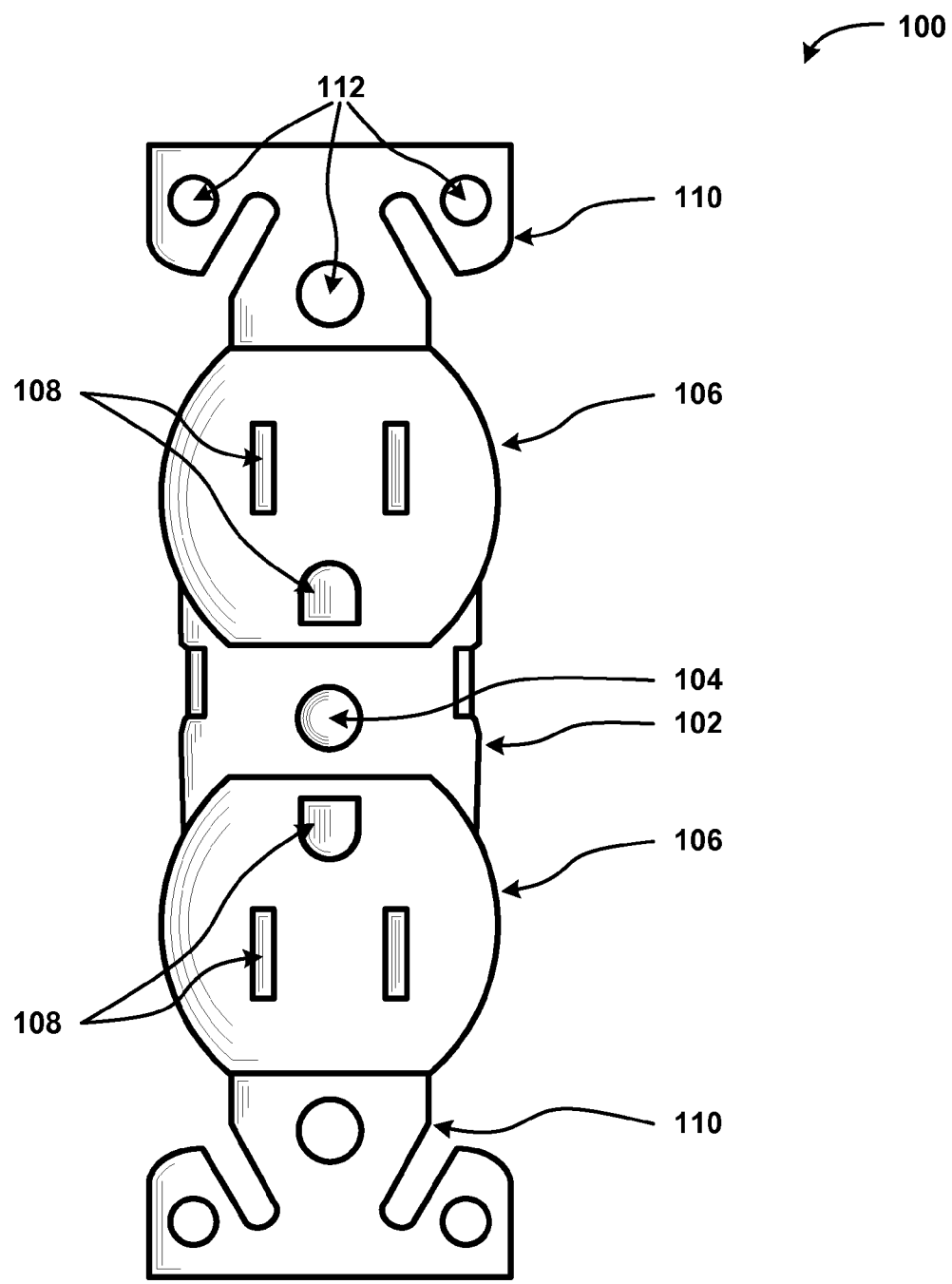
FIG. 1 is a front elevation view of an intumescent electrical device, according to an exemplary embodiment.

The following detailed description is directed to intumescent swell devices. According to various embodiments, the swell devices disclosed herein can be used alone or in combination with one another and/or other devices or assemblies to provide heat and/or fire protection for electrical systems, devices, and/or assemblies. According to exemplary embodiments, intumescent electrical devices, intumescent firewall insert boxes, intumescent flanges, and/or intumescent electrical boxes are disclosed herein for use individually and/or in combination with one another.

In the following detailed description, references are made to the accompanying drawings that form a part hereof, and in which are shown by way of illustration specific embodiments or examples. It must be understood that the disclosed embodiments are merely exemplary of the concepts and technologies disclosed herein. The concepts and technologies disclosed herein may be embodied in various and alternative forms, and/or in various combinations of the embodiments disclosed herein. The word "exemplary," as used in the specification, is used expansively to refer to embodiments that serve as an illustration, specimen, model or pattern.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of intumescent swell devices will be presented.

FIG. 1 is a front elevation view illustrating an intumescent electrical device 100, according to an exemplary embodiment. The intumescent electrical device 100 can be formed from a combination of materials and components and can provide a variety of functions. In some embodiments, the intumescent electrical device 100 is configured to provide functionality associated with an electrical receptacle, a light switch, a light dimmer, a proximity sensor, a light sensor, combinations thereof, and the like. In the illustrated embodiment, the intumescent electrical device 100 provides functionality associated with an electrical receptacle. It should be understood that this embodiment is exemplary, and should not be construed as being limiting in any way.

In the illustrated embodiment, the intumescent electrical device 100 includes a body portion 102. The body portion 102 can serve as a backbone for the intumescent electrical device 100. In some embodiments, the body portion 102 supports and/or holds together various components of the intumescent electrical device 100, and/or provides additional or alternative functionality. In the illustrated embodiment, the body portion 102 includes an attachment aperture 104. According to various embodiments, the attachment aperture 104 includes a threaded hole for engaging a screw, for example, for securing an outlet cover (not illustrated) or other components or assemblies to the intumescent electrical device 100. It should be understood that this embodiment is exemplary as other attachment mechanisms such as magnets, mechanical and chemical adhesives, pressure fit mechanisms, and the like can be used to connect mechanisms to the intumescent electrical device 100, if desired.

The intumescent electrical device 100 also includes two plug assemblies 106. The plug assemblies 106 can be formed from or coated with intumescent plastics and/or other intumescent materials. For example, the plug assemblies 106 can be coated or painted with intumescent paints and/or intumescent coatings. While two plug assemblies 106 are illustrated in FIG. 1, it should be understood that various embodiments of the intumescent electrical device 100 include none, fewer than two, or more than two plug assemblies 106. In some embodiments, the plug assemblies 106 of the intumescent electrical device 100 can be replaced with rocker switches, dimmers, photovoltaic sensors, combinations thereof, and the like, some, all, or none of which can be formed from intumescent plastics, coated with intumescent plastics, coatings, or paints, and/or formed from or coated with other materials.

In some embodiments, the plug assemblies 106 are formed from an intumescent plastic material. The intumescent plastic material can include various polymers such as polyvinyl chloride ("PVC"), acrylonitrile butadiene styrene ("ABS"), other thermoplastics, and/or other materials that can be mixed with intumescent powders and/or polymers to form a intumescent plastic. For purposes of this specification and the appended claims, the term "intumescent plastic," and variations thereof, is used to refer to any plastic, thermoplastic, or other material that is configured to intumesce when exposed to heat at or above a defined threshold. In some embodiments, the intumescent plastic is formulated to intumesce when exposed to heat above three hundred fifty degrees Celsius. In other embodiments, the intumescent plastic is formulated to intumesce when exposed to heat above four hundred degrees Celsius. It should be understood that these embodiments are exemplary, and that lower or higher temperatures can be defined as the threshold for the intumescent plastic. Furthermore, it will be understood that the intumescent plastic chosen for a particular application can be formulated, shaped, sized, configured, and/or otherwise designed based upon a desired heat threshold for a particular application in which the intumescent plastic is used.

In some implementations, the intumescent plastic used to form the plug assemblies 106 and/or the body portion 102 can be hardened. For example, the intumescent plastic can be hardened with KEVLAR and/or other aromatic polyamides ("aramids" and "para-aramids"), coatings, reinforcements, and/or other means, if desired. The plug assemblies 106 also can be reinforced with various metal, ceramic, graphite, and/or other non-metal structures instead of, or in addition to, hardening the intumescent plastic with chemical additives or coatings. For purposes of the specification and claims, the term "intumescent plastic" further includes these and other variations of the intumescent plastic materials described herein.

The plug assemblies 106 can include a number of slots 108, which can be configured to facilitate electrical connections between devices and an electrical power source (not illustrated) that supplies the intumescent electrical device 100 with electrical connectivity. Although not illustrated in FIG. 1, it should be understood that conductive materials can be disposed within, behind, or through the slots 108. In some embodiments, the conductive material includes copper, aluminum, and/or other metals, as well as non-metal conductors.

The intumescent electrical device 100 also includes two straps 110, sometimes referred to as mounting yokes. The straps 110 can be used to secure the intumescent electrical device 100 in a desired location and configuration. For example, the straps 110 can be used to secure the intumescent electrical device 100 to a wall, an electrical box, and the like. The straps 110 can be formed in various shapes and configurations, and are not limited to the illustrated shapes and/or configurations. According to various embodiments, the straps 110 are formed from metals such as steel, aluminum, and/or other metals, plastics, hardened plastics, intumescent materials, and/or other suitable materials. In some embodiments, the straps 110 are formed from intumescent plastics, coated with intumescent plastics, paints, or coatings, and/or formed from other materials, some, all, or none of which can be hardened or reinforced as described above.

In the illustrated embodiment, the straps 110 include apertures 112. The apertures 112 can be used for securing the intumescent electrical device 100 to a wall, an electrical box, an insert box, and/or other structures, if desired. Additionally, or alternatively, the apertures 112 can be configured to accept connection mechanisms such as screws and the like. For example, screws, bolts, or other structures can be passed through the apertures 112 to secure the intumescent electrical device 100 to a structure such as a wall, an electrical box, other electrical devices or assemblies, and the like. These examples are illustrative, and should not be construed as being limiting in any way.

According to various embodiments, the intumescent electrical device 100 is configured to swell or intumesce when exposed to heat above a specified threshold, as mentioned above. In some embodiments, the intumescent electrical device 100 is configured to swell or intumesce when exposed to heat above three hundred fifty degrees Fahrenheit (approximately one hundred seventy seven degrees Celsius). In other embodiments, the intumescent electrical device 100 is configured to swell or intumesce when exposed to heat above three hundred fifty degrees Celsius. According to various embodiments, some, all, or none of the plastic parts of the intumescent electrical device 100 are formed from intumescent plastic. Furthermore, some components of the intumescent electrical device 100 such as the straps 110 can be formed from intumescent plastic, as can screws or other attachment mechanisms used to interface with the intumescent electrical device 100.

If the intumescent electrical device 100 is exposed to heat or fire, the intumescent plastic components of the intumescent electrical device 100 are configured to swell to prevent spreading of the fire and/or heat. Thus, the intumescent electrical device 100 can smother flames and/or prevent spreading of the flames in a fire condition by insulating air passages adjacent the fire, thereby preventing spreading of the flames and/or interrupting oxygen flow to the fire. Furthermore, as will be explained in more detail herein, the intumescent electrical device 100 can be used in combination with other intumescent electrical structures to provide electrical systems that meet and/or exceed the two-hour E-119 ASTM standard for firewalls and electrical structures, even if placed in a back-to-back configuration with other electrical systems in the same or adjacent firewalls.

Figure 2:
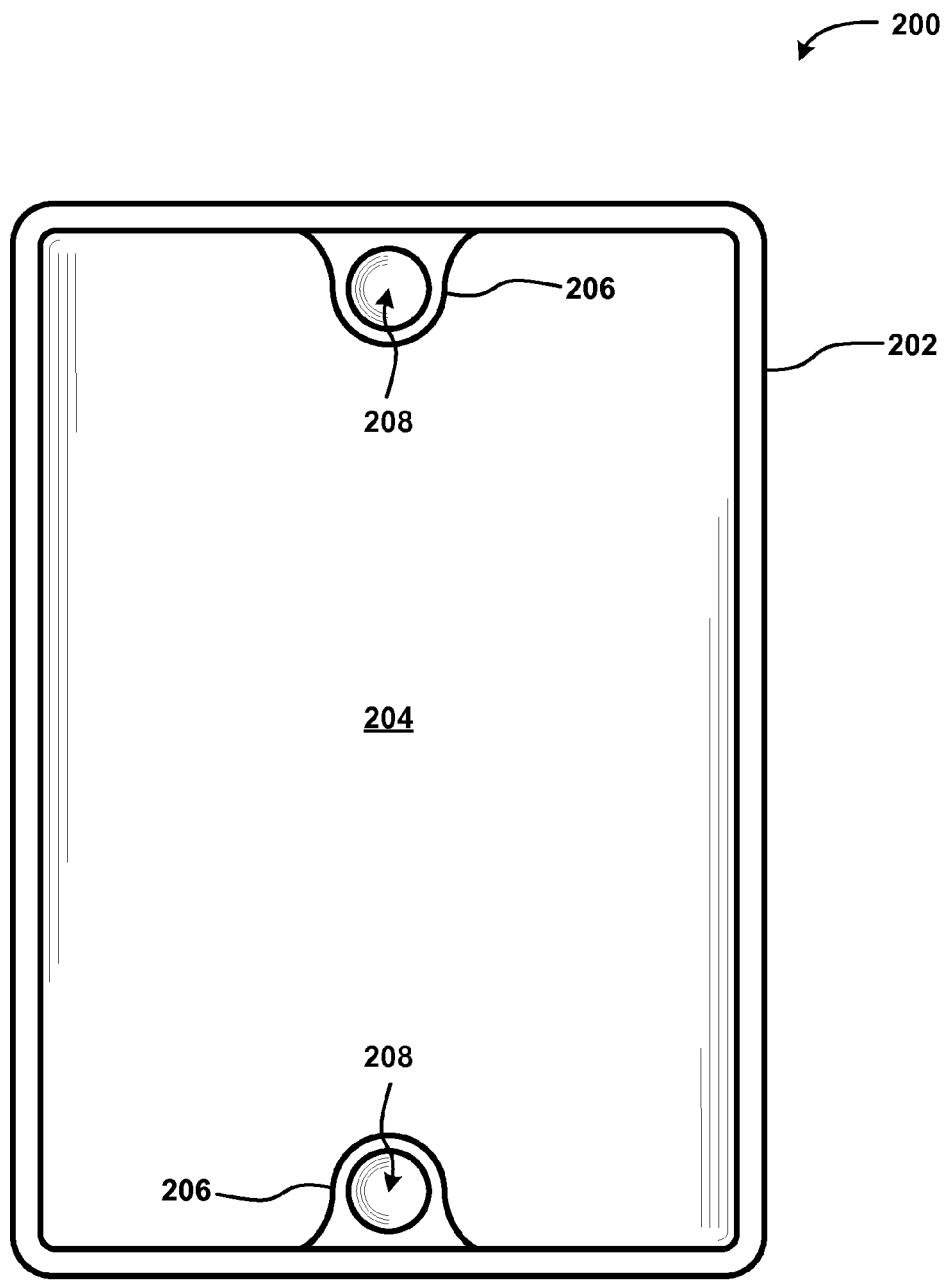
FIG. 2 is a front elevation view of an intumescent electrical box, according to an exemplary embodiment.

Turning now to FIG. 2, an intumescent electrical box 200 is illustrated, according to an exemplary embodiment. According to various embodiments, the intumescent electrical box 200 is formed from intumescent plastics or other intumescent materials. In some embodiments, the intumescent electrical box 200 is formed from metals, non-metals, and/or other materials and coated with intumescent plastics, coatings, or paints, and/or formed from or coated with other intumescent materials such as those described above. In the illustrated embodiment, the intumescent electrical box 200 is formed from intumescent plastic and hardened with one or more suitable materials such as KEVLAR or other materials.

The intumescent electrical box 200 includes walls 202 and a back portion 204. The walls 202 extend away from the viewing pane of FIG. 2 (visible in FIG. 7). Although not visible in FIG. 2, it should be understood that one or more ports or other openings can be formed in one or more of the walls 202 and/or the back portion 204, and that wiring can be passed through the openings and into the intumescent electrical box 200 for various purposes. In some embodiments, the intumescent electrical box 200 is used as a junction box for two or more sets of wiring. In other embodiments, the intumescent electrical box 200 is used as an electrical box for an electrical receptacle such as the intumescent electrical device 100 described and illustrated above with reference to FIG. 1. In yet other embodiments, the intumescent electrical box 200 is used as an electrical box for cameras, sensors, telephone jacks, networking jacks, audio and video wiring, light switches, television wiring, breaker boxes, circuit interrupts, combinations thereof, and the like. The intumescent electrical box 200 also can be used as a wiring box for ceiling and/or floor applications such as light fixtures, audio wiring or jacks, phone and/or networking jacks, smoke detectors, heat detectors, carbon monoxide detectors, alarm sensors or panels, other sensors or fixtures, and the like. Thus, it will be understood that the illustrated shape and configuration of the intumescent electrical box 200 is illustrative and should not be construed as being limiting in any way.

The illustrated intumescent electrical box 200 includes two support structures 206. Other embodiments of the intumescent electrical box 200 include none, one support structure 206, or more than two support structures 206. The illustrated support structures 206 include apertures 208 for accepting or mating with engagement mechanisms such as screws, bolts, and the like. According to one embodiment, a screw is passed through the apertures 112 of the intumescent electrical device 100 and into the apertures 208 of the intumescent electrical box 200 to secure the intumescent electrical device 100 to the intumescent electrical box 200. This embodiment is exemplary and should not be construed as being limiting in any way.

It will be appreciated that the intumescent electrical box 200 can be used to provide fire protection. For example, as mentioned above, the intumescent electrical box 200 can be used as an electrical box for the intumescent electrical device 100. Thus, if a wiring failure occurring in the intumescent electrical box 200 or intumescent electrical device 100 results in a high heat or fire condition, the intumescent electrical box 200 can be used to contain the high heat or fire condition by swelling toward the high heat or fire condition, thereby smothering the fire or insulating the fire from oxygen. Thus, it will be understood that the intumescent electrical device 100 and/or the intumescent electrical box 200 can be configured to smother a fire or high heat condition to provide fire protection and/or to insulate the fire from an oxygen source.

Figure 3A:
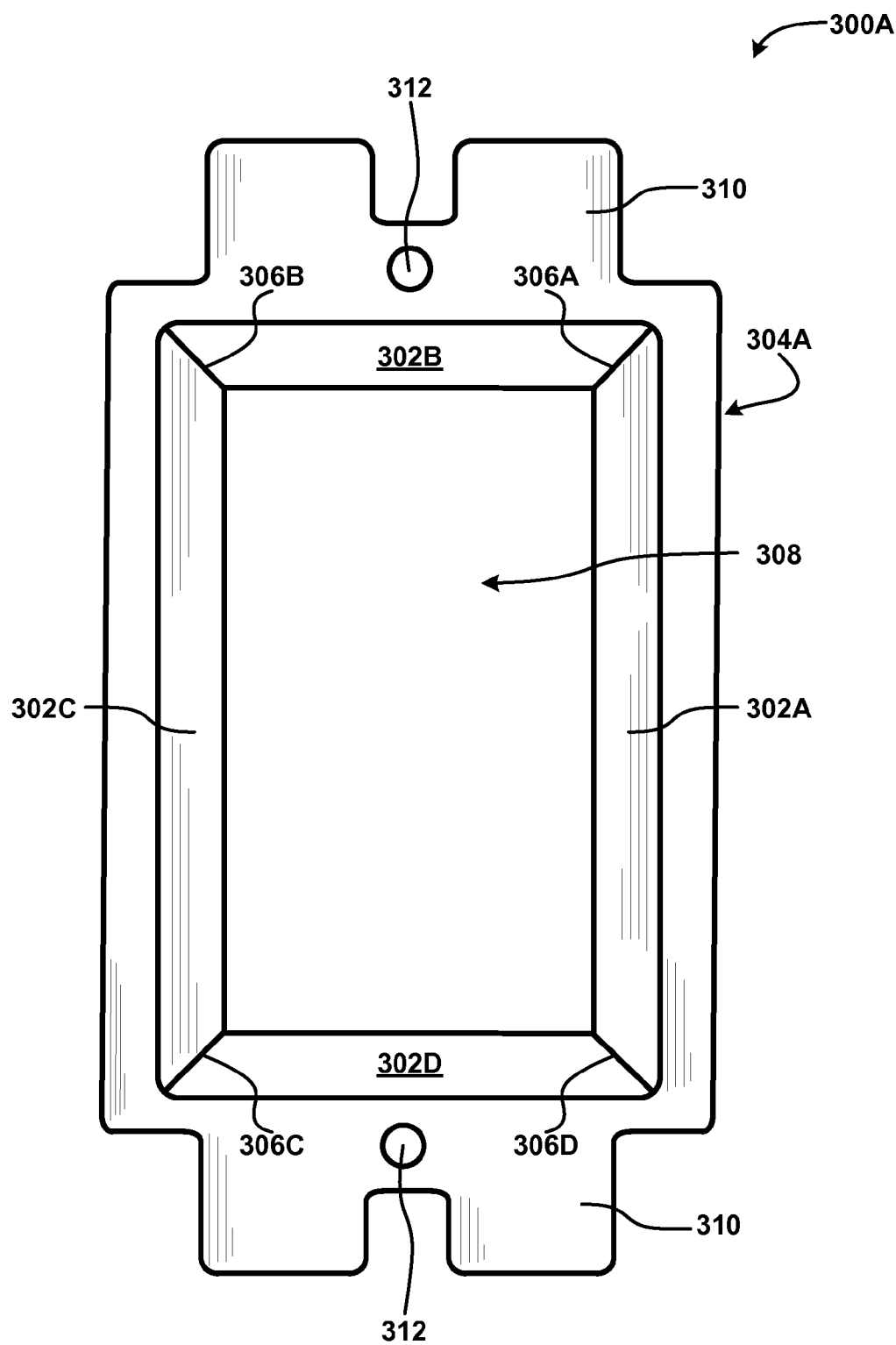
FIGS. 3A-3B are front elevation views illustrating intumescent firewall insert boxes, according to exemplary embodiments.

Turning now to FIG. 3A, an intumescent firewall insert box 300A is illustrated, according to an exemplary embodiment. The intumescent firewall insert box 300A can include a number of walls 302A-D (hereinafter collectively referred to as "walls 302") held together by a flange portion 304A. The walls 302 extend away from the viewing pane of FIG. 3A (visible in FIG. 7). In the illustrated embodiment, the walls 302 are joined to one another at corners 306A-D. More particularly, the walls 302A and 302B are joined to one another by the corner 306A, the walls 302B and 302C are joined to one another by the corner 306B, the walls 302C and 302D are joined to one another by the corner 306C, and the walls 302D and 302A are joined to one another by the corner 306D. In other embodiments, some, none, or all of the walls 302 are not joined to one another and/or are only partially joined to one another. Thus, while the walls 302 are illustrated as contacting one another at the corners 306, this is not necessarily the case. Thus, it should be understood that the illustrated embodiment is exemplary, and should not be construed as being limiting in any way.

According to various embodiments, the flange portion 304A of the intumescent firewall insert box 300 is shaped and/or configured for use in or with various applications. More particularly, the shape and configuration of the flange portion 304A can include various shapes, sizes, and/or configurations to accommodate a number of applications, as will be explained in more detail below with additional reference to FIGS. 3B-7. Thus, the illustrated flange portion 304A is exemplary, and should not be construed as being limiting in any way.

In some embodiments, the walls 302 terminate at an open end 308 of the intumescent firewall insert box 300. In other embodiments, a rear wall is disposed at the rear of the intumescent firewall insert box 300 instead of the open end 308. If the intumescent firewall insert box 300 is configured with an open end 308, as illustrated in FIG. 3, the intumescent firewall insert box 300 can be inserted into existing electrical boxes such as the intumescent electrical box 200. Thus, electrical boxes can be retrofitted with the intumescent firewall insert box 300 to provide fire and/or heat protection. Additionally, or alternatively, metal or plastic electrical boxes can be installed with the intumescent firewall insert box 300 to provide fire and/or heat protection and/or to provide enhanced fire and/or heat protection.

According to various embodiments, the flange portion 304A includes two tab portions 310. The tab portions 310 can provide support for the flange portion 304A, for example by contacting a surface of a wall or other structure with which the intumescent firewall insert box 300 is brought into contact. The tab portions 310 can include apertures 312 through which securing structures such as screws, bolts, and the like can be passed for securing mechanisms through the intumescent firewall insert box 300 into other structures. In some embodiments, for example, a screw is passed through one or more of the apertures 112 of the intumescent electrical device 100, through one or more of the apertures 312 of the intumescent firewall insert box 300, and into the apertures 208 of the intumescent electrical box 200, thereby securing the intumescent electrical device 100 to the intumescent firewall insert box 300 and the intumescent electrical box 200. Thus, the intumescent firewall insert box 300 can be installed with other intumescent plastic electrical assemblies to provide heat and fire protection for a wiring installation.

Figure 3B:
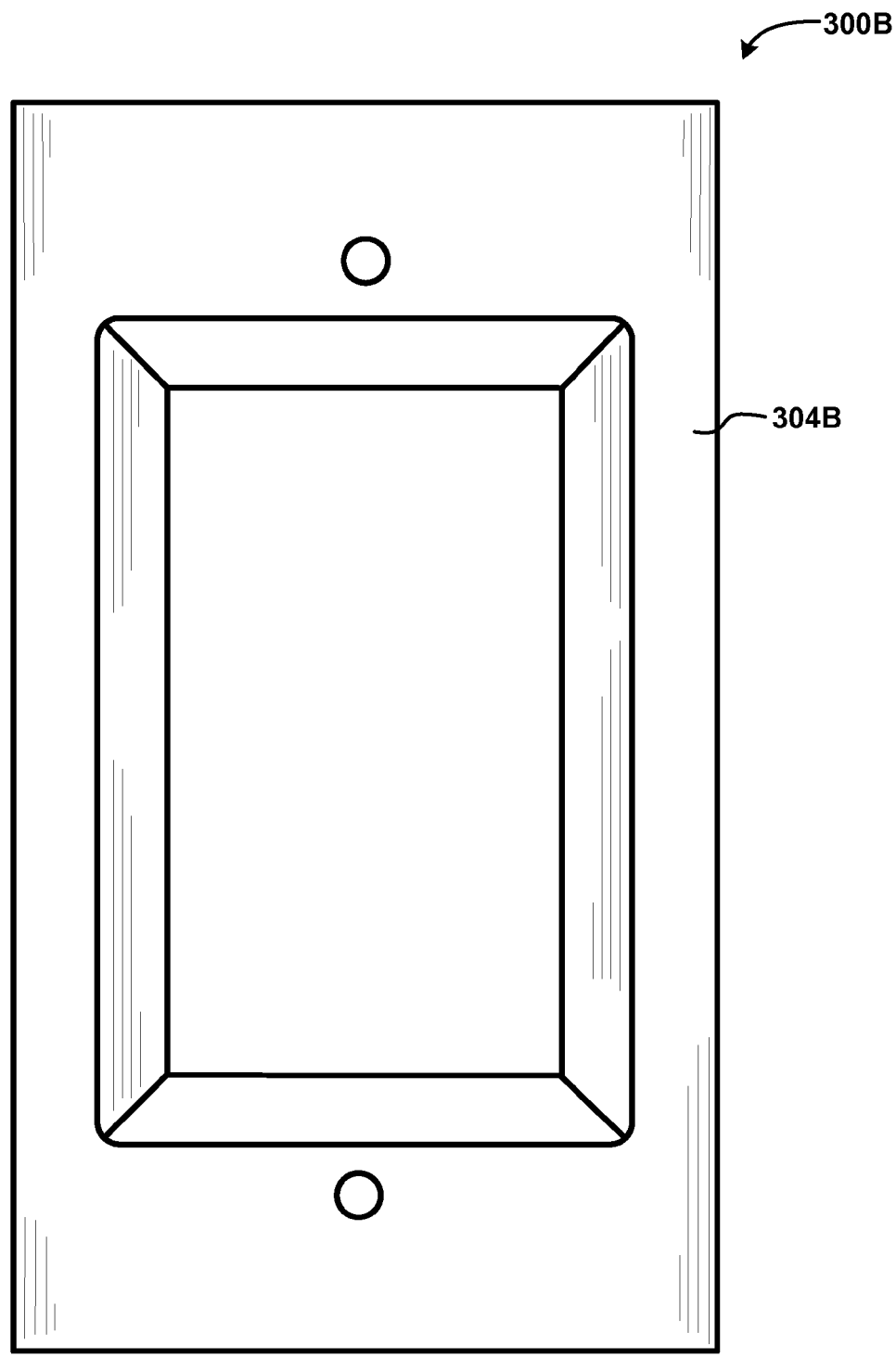

Turning now to FIG. 3B, an intumescent firewall insert box 300B is illustrated, according to another exemplary embodiment. The intumescent firewall insert box 300B is similar to the intumescent firewall insert box 300A illustrated in FIG. 3A, though the flange portion 304B of the intumescent firewall insert box 300B has a different shape, size, and configuration than the flange portion 304A of the intumescent firewall insert box 300A illustrated in FIG. 3A. As will be explained in more detail herein, the flange portions 304B can be shaped, sized, and configured based upon an intended or anticipated use or application. Thus, the size, shape, and configuration of the flange portion 304B also are exemplary, and should not be construed as being limiting in any way. In the illustrated embodiment, the other components of the intumescent firewall insert box 300B are similar to the respective components of the intumescent firewall insert box 300A, though this is not necessarily the case. As such, the other structures and/or components of the intumescent firewall insert box 300B are not described in detail with respect to FIG. 3B.

Figure 4:
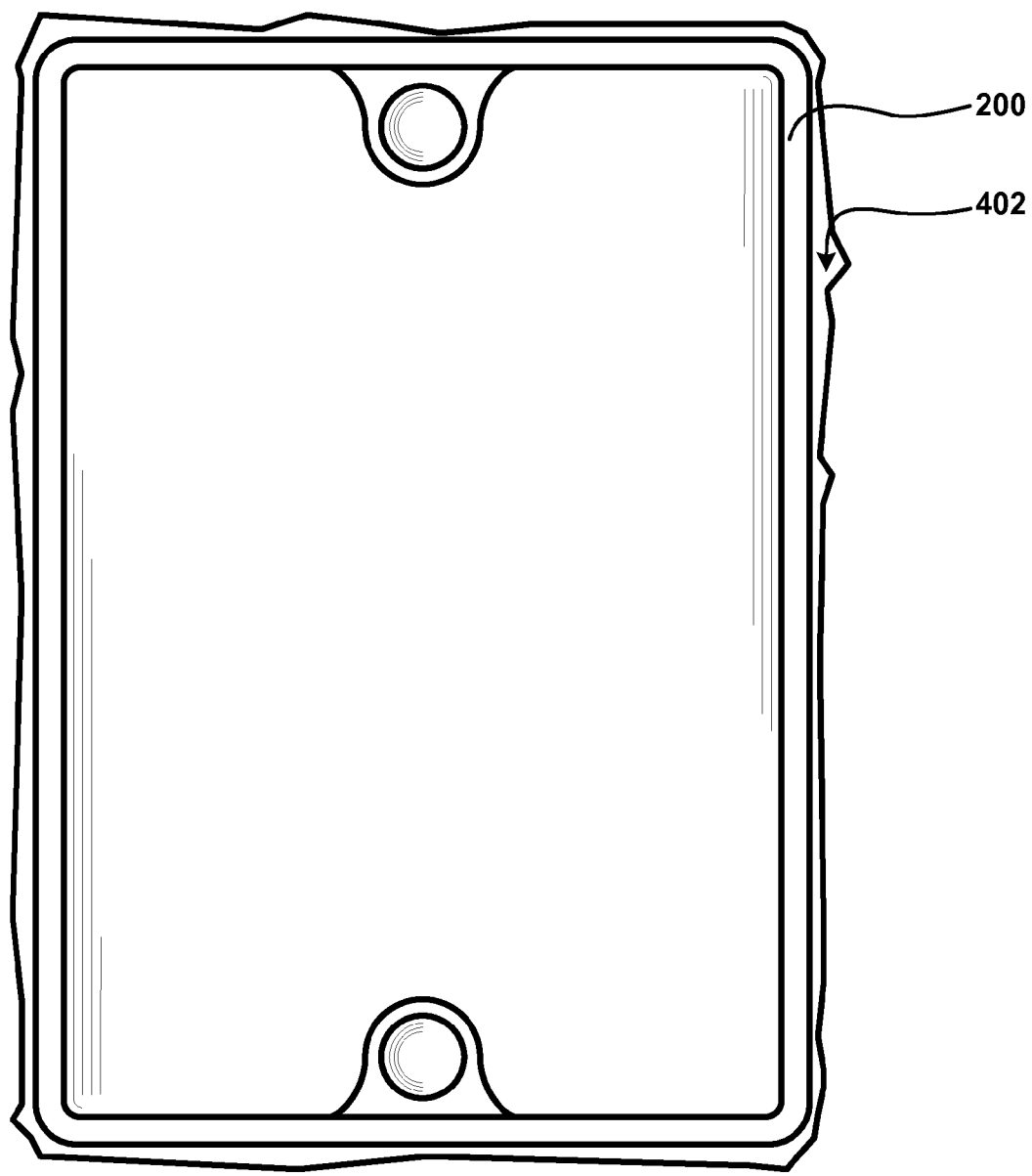
FIG. 4 is a front elevation view of intumescent swell devices implemented in a firewall, according to an exemplary embodiment.

Referring now to FIG. 4, additional aspects of the electrical assemblies disclosed herein will be described in more detail. FIG. 4 illustrates the intumescent electrical box 200 in an exemplary implementation. In the illustrated implementation, an opening has been cut into a wall covering 400 such as sheet rock or other material. As is generally known, an electrical box such as the intumescent electrical box 200 can be installed before the wall covering 400 is put into place. Before putting the wall covering 400 in place, the approximate location of the electrical box can be determined, and a corresponding opening can be cut into the wall covering 400 to allow access to the electrical box. Thus, as illustrated in FIG. 4, a gap 402 can exist between the wall covering 400 and the intumescent electrical box 200 after the wall covering 400 is put in place.

A gap such as the gap 402 illustrated in FIG. 4 can create vulnerabilities in fire rated walls. For example, if a fire or high heat condition exists within or proximate to the intumescent electrical box 200, flames or high heat can pass through the gap 402. Thus, flames and/or heat can enter electrical assemblies through the gap 402. Additionally, or alternatively, a fire or heat within or behind the wall covering 400 can enter a room through the gap 402. Thus, a fire or high heat condition associated with one or more electrical assemblies can spread or increase due to air passing through openings such as the gap 402. In the case of a firewall or other fire-rated structure, heat or flames passing through the gap 402 can cause a failure in the firewall and/or lessen the level of protection afforded by the firewall.

Figure 5:
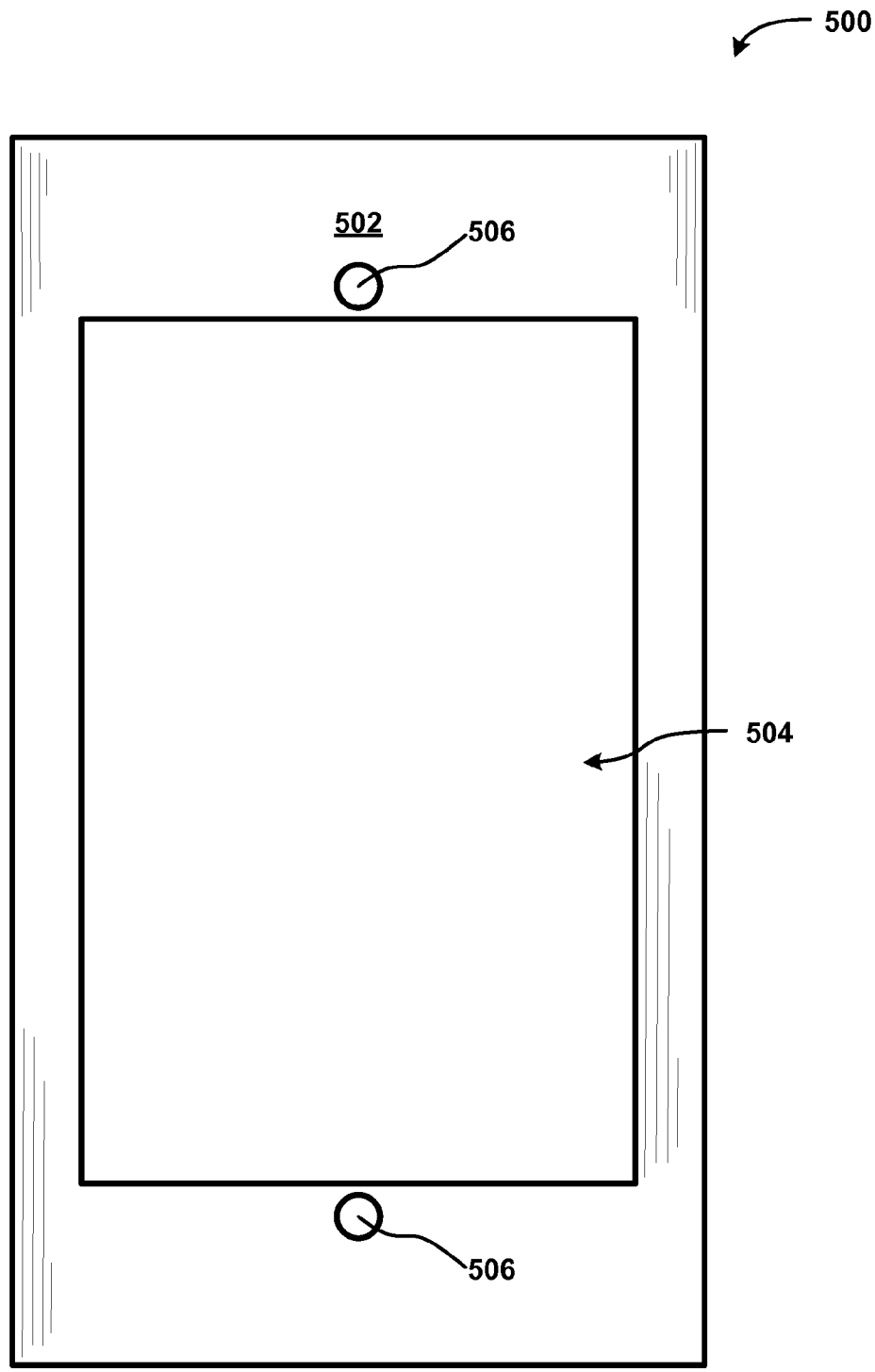
FIG. 5 is a front elevation view of an intumescent flange, according to an exemplary embodiment.

Turning now to FIG. 5, an intumescent flange 500 is illustrated, according to an exemplary embodiment. In some embodiments, the intumescent flange 500 is used in combination with the intumescent firewall insert box 300A to extend the flange portion 304A of the intumescent firewall insert box 300A. In other embodiments, as illustrated above in FIGS. 3A-3B, the flange portions 304A, 304B of the intumescent firewall insert boxes 300A, 300B can be shaped and sized in a manner similar to the intumescent flange 500 illustrated in FIG. 5. Thus, the intumescent flange 500 can be omitted in some applications, if desired. In other applications, the intumescent flange 500 is used to supplement, compliment, and/or increase the protection provided by the flange portions 304A, 304B of the intumescent firewall insert boxes 300A, 300B. Thus, the illustrated embodiments are exemplary, and should not be construed as being limiting in any way.

The intumescent flange 500 includes a body 502. The body 502 can be formed from intumescent plastic or other materials. In some embodiments, the intumescent flange 500 is configured to cover the gap 402 discussed above with reference to FIG. 4. Thus, the intumescent flange 500 can be used to increase heat and/or fire protection for a wall by providing additional fire and heat protection at the gap 402 described above. In other embodiments, the intumescent flange 500 can be formed as a piece of sheet metal, which can be coated with an intumescent material such as an intumescent plastic, coating, or paint. Additionally, or alternatively, one or more intumescent gaskets can be adhered to the sheet metal, if desired. In other embodiments, the intumescent flange 500 is configured for use with the intumescent firewall insert boxes 300A, 300B, but is not formed from an intumescent material. Thus, the illustrated embodiment is exemplary and should not be construed as being limiting in any way.

The body 502 can include an opening 504 through which the intumescent firewall insert box 300, wiring, other electrical devices and assemblies, and the like can be passed, if desired. The body 502 also can include apertures 506 through which securing mechanisms such as screws, bolts, and the like can be passed to secure the intumescent flange 500 to the intumescent firewall insert box 300, the intumescent electrical box 200, the intumescent electrical device 100, and/or other structures and/or devices. As mentioned above, the functionality of the intumescent flange 500 can be provided by the flange portions 304A, 304B of the intumescent firewall insert boxes 300A, 300B. Thus, it should be understood that the functionality of the apertures 506 can be provided by the apertures 312 of the intumescent firewall insert boxes 300A, 300B.

Figure 6:
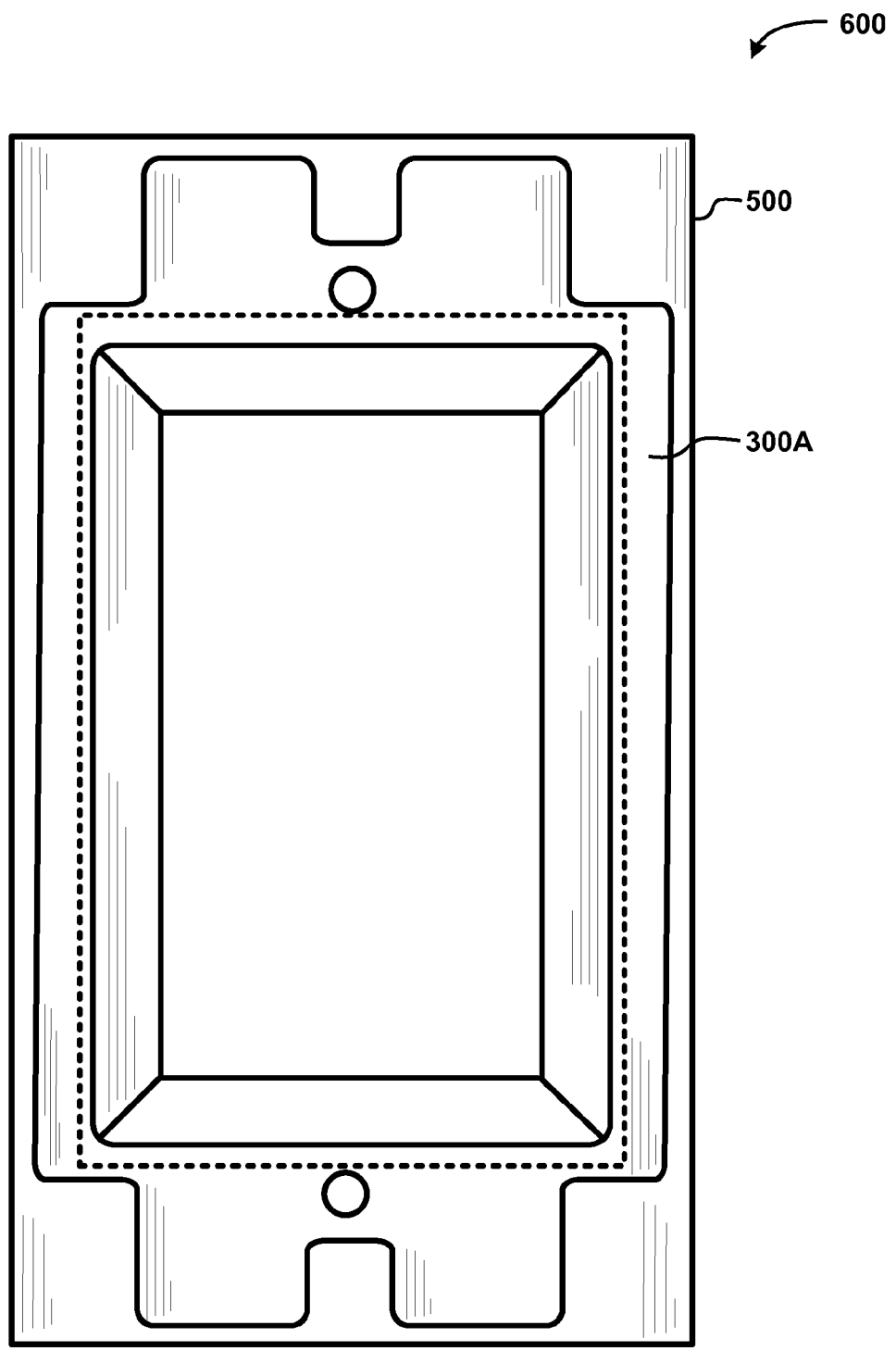
FIG. 6 is an assembly drawing illustrating an intumescent firewall insert box mated to an intumescent flange, according to an exemplary embodiment.

Referring now to FIG. 6, additional features of the electrical assemblies disclosed herein are illustrated, according to an exemplary embodiment. FIG. 6 illustrates an assembly 600 formed by assembling the intumescent flange 500 with the intumescent firewall insert box 300A. It will be appreciated that the configuration and shape of the assembly 600 is similar to the intumescent firewall insert box 300B illustrated in FIG. 3B. Thus, it will be appreciated that the intumescent firewall insert box 300A and the intumescent flange 500 can be varied to accommodate a number of applications in addition to, or instead of, altering the flange portions 304A, 304B of the respective intumescent electrical boxes 300A, 300B.

Figure 7:
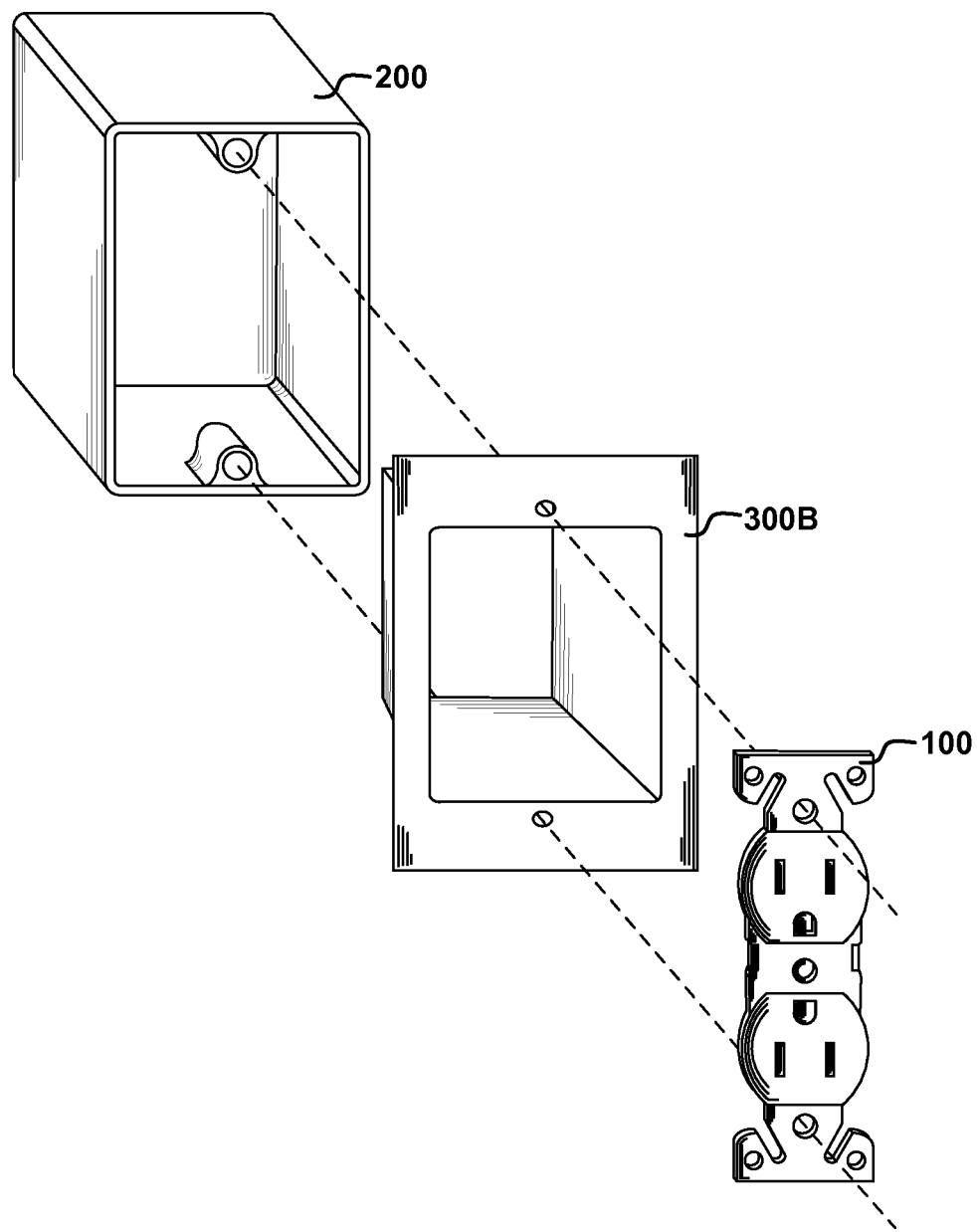
FIG. 7 is an assembly drawing illustrating an intumescent electrical assembly, according to an exemplary embodiment.

Although not illustrated in the figures, it should be understood that the intumescent devices disclosed herein can be complimented by other intumescent and/or non-intumescent devices or structures such as, for example, electrical box covers, intumescent electrical box cover, outlet covers, intumescent outlet covers, screws or other securing mechanisms, intumescent screws or other securing mechanisms, intumescent gaskets, and the like. In one exemplary embodiment, as illustrated in FIG. 7, an intumescent electrical device 100 is assembled with an intumescent electrical box 200. In some embodiments, as shown in FIG. 7, an intumescent firewall insert box 300A, 300B also can be included, and can be assembled between the intumescent electrical device 100 and the intumescent electrical box 200, if desired. Although not shown in FIG. 7, it should be understood that an intumescent flange 500 also can be included, as described above with reference to FIGS. 5-6.

According to some embodiments, one or more intumescent gaskets are placed within an intumescent outlet cover, and the intumescent gasket and outlet cover are attached to the intumescent electrical device 100. According to various implementations, the assembly shown in FIG. 7, and/or other devices or structures assembled therewith, can provide an electrical assembly that meets or exceeds the two hour E-119 ASTM standard for fire-rated walls or ceilings. This standard can be met, in some embodiments, even when multiple assemblies such as that illustrated in FIG. 7 are placed in a back-to-back configuration with one another and/or within twenty four inches of one another on the same or opposite sides of a fire-rated wall or ceiling.

Additionally, though not illustrated or described herein, it will be appreciated that a fire resistant electrical assembly can be constructed in accordance with the concepts and technologies disclosed herein. In an exemplary embodiment, an intumescent electrical box 200 is installed in a desired location. The wiring for the electrical assembly is run to the intumescent electrical box 200 and connected to an intumescent electrical device 100 such as an intumescent electrical receptacle. An intumescent firewall insert box 300A, 300B is placed into the intumescent electrical box 200.

During placement of the intumescent firewall insert box 300A, 300B into the intumescent electrical box 200, the wiring and the intumescent electrical device 100 can be passed through the open end 308 of the intumescent firewall insert box 300A, 300B. In some embodiments, an intumescent flange 500 is placed between the intumescent firewall insert box 300A, 300B and the intumescent electrical box 200, though this is not necessarily the case. The intumescent electrical device 100 can be secured to the intumescent electrical box 200, the intumescent firewall insert box 300A, 300B, and/or the intumescent flange 500, if desired. An intumescent electrical device cover and/or an intumescent gasket also can be secured to the front of the assembly, if desired.

As mentioned above, the concepts and technologies disclosed herein also can be used to retrofit a non-intumescent electrical assembly to provide intumescent fire protection at the electrical assembly. According to one embodiment, an electrical device is removed from wiring supplying the electrical assembly with power, and is replaced with an intumescent electrical device 100 that provides the same, similar, or different functionality, depending upon needs or desires. An intumescent firewall insert box 300A, 300B can be inserted into the electrical box to increase the fire protection of the electrical assembly, if desired. Additionally, or alternatively, an intumescent flange can be installed at the electrical assembly to cover a gap 402 between a wall covering 400 and the electrical box associated with the electrical assembly.

In some embodiments, an intumescent electrical device cover or non-intumescent electrical device can be attached to the electrical assembly. If desired, an intumescent gasket can be disposed between the electrical device cover and the electrical assembly to further increase the fire protection afforded by the various devices disclosed herein. Additionally, the components of the electrical assembly can be joined together with intumescent screws or other attachment mechanisms, if desired. In one embodiment, the intumescent attachment mechanisms are formed from hardened intumescent plastic or metal coated with an intumescent material such as an intumescent plastic, an intumescent coating, and/or an intumescent paint.

As mentioned above, while the above embodiments have discussed electrical assemblies, the concepts and technologies disclosed herein also can be used to provide fire protection for various other devices. For example, the concepts and technologies disclosed herein can be used to provide fire protection for electrical receptacles, networking jacks, telephone jacks, light fixtures, light switches, proximity or photo sensors, audio jacks, video jacks, television jacks, and the like. Thus, the above embodiments should be understood as exemplary, and should not be construed as being limiting in any way.

Based on the foregoing, it should be appreciated that intumescent swell devices have been disclosed herein. Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

I claim:

1. An electrical assembly, comprising:
an electrical box; and
an intumescent electrical device having a strap for mounting the intumescent electrical device in a desired configuration with respect to the electrical box, wherein the intumescent electrical device comprises at least one component formed from an intumescent material, and is secured to the electrical box by at least one intumescent securing mechanism formed from an intumescent material comprising an intumescent plastic.

2. An intumescent electrical assembly, comprising:
an intumescent electrical box formed from an intumescent material;
an intumescent electrical device having a strap for mounting the electrical device in a desired configuration with respect to the intumescent electrical box, wherein the intumescent electrical device comprises at least one component formed from the intumescent material; and
an intumescent firewall insert box comprising at least two walls joined to a flange portion, the intumescent firewall insert box being formed from the intumescent material, wherein the intumescent firewall insert box is inserted into the intumescent electrical box, and wherein the flange portion covers a gap between the intumescent electrical box and a wall covering adjacent the intumescent electrical box, and wherein the intumescent electrical device is secured to the intumescent electrical box by at least one intumescent securing mechanism formed from the intumescent material.

3. An intumescent electrical assembly, comprising:
an intumescent electrical box formed from an intumescent material;
an intumescent electrical device having a strap for mounting the electrical device in a desired configuration with respect to the intumescent electrical box, wherein the intumescent electrical device comprises at least one component formed from the intumescent material;
an intumescent electrical device cover secured to the intumescent electrical device with at least one intumescent securing mechanism, and
an intumescent firewall insert box comprising at least two walls joined to a flange portion, the intumescent firewall insert box being formed from the intumescent material, wherein the intumescent firewall insert box is inserted into the intumescent electrical box, and wherein the flange portion covers a gap between the intumescent electrical box and a wall covering adjacent the intumescent electrical box, and wherein the intumescent electrical device is secured to the intumescent electrical box by at least one intumescent securing mechanism formed from the intumescent material.

* * * * *